United States Patent [19]

Nohira et al.

[11] 4,168,678
[45] Sep. 25, 1979

[54] INTERNAL COMBUSTION ENGINE WITH AUXILIARY PISTON FOR GENERATING TURBULENCE

[75] Inventors: Hidetaka Nohira, Mishima; Hisashi Ōki, Numazu; Sumio Itō, Susono, all of Japan

[73] Assignee: Toyota Jidosha Kogyo Kabushiki Kaisha, Aichi, Japan

[21] Appl. No.: 859,816

[22] Filed: Dec. 12, 1977

[30] Foreign Application Priority Data

Aug. 30, 1977 [JP] Japan .............................. 52-103160

[51] Int. Cl.² ............................................ F02B 19/06
[52] U.S. Cl. ................................ 123/30 C; 123/32 C; 123/53 A; 123/78 A; 123/191 SP
[58] Field of Search ................ 123/30 C, 30 D, 32 B, 123/32 C, 32 SP, 32 ST, 191 S, 191 R, 191 SP, 143 A, 53 R, 53 A, 53AA, 48 R, 48 A, 48 AA, 78 A, 78 AA

[56] References Cited

U.S. PATENT DOCUMENTS

| | | | |
|---|---|---|---|
| 2,033,155 | 3/1936 | Scott | 123/191 SP |
| 2,091,410 | 8/1937 | Mallory | 123/53 A |
| 3,092,088 | 6/1963 | Goossak et al. | 123/191 SP |
| 3,446,192 | 5/1969 | Woodward | 123/53 A |
| 3,776,212 | 12/1973 | Karlowitz | 123/191 SP |
| 3,890,940 | 6/1975 | List | 123/191 SP |
| 3,911,878 | 10/1975 | Hofbauer et al. | 123/32 ST |
| 4,040,400 | 8/1977 | Kiener | 123/143 A |

FOREIGN PATENT DOCUMENTS 399767 7/1909 France ................................. 123/53 A Primary Examiner—Charles J. Myhre
Assistant Examiner—Craig R. Feinberg
Attorney, Agent, or Firm—Stevens, Davis, Miller & Mosher

[57] ABSTRACT

An internal combustion engine is provided with an auxiliary piston reciprocating within an auxiliary chamber for generating turbulence in a gas mixture contained within a main combustion chamber. Forward motion of the auxiliary piston causes the injection of a gas into the main combustion chamber through a communicating passageway when the main piston approaches top dead center of the compression stroke.

5 Claims, 7 Drawing Figures

INTERNAL COMBUSTION ENGINE WITH AUXILIARY PISTON FOR GENERATING TURBULENCE

BACKGROUND AND SUMMARY OF THE INVENTION

This invention relates to an internal combustion engine with an auxiliary piston for generating turbulence which is designed to improve the combustibility of the combustible mixture. The auxiliary piston is provided in an auxiliary chamber having a passage communicating with a main combustion chamber so that the forward motion of the auxiliary piston injects a compressed gas through the communicating passage into the main combustion chamber to generate turbulence therein.

Lean combustible mixture systems and exhaust gas recirculation systems are known to be effective in decreasing noxious substances (carbon monoxide, hydrocarbons and especially nitrogen oxides) in automotive exhaust gases. As is also well-known, however, combustible mixtures used in these two systems are composed of partially incombustible compositions, which leads to low flame propagation speed and unstable combustion. As a result, various means have been devised to eliminate such shortcomings and improve combustion. These means include providing a small diameter swirl intake port to generate swirl and thus turbulence in air sucked on the intake stroke, a squish area formed in the combustion chamber to generate turbulence in the combustible mixture, and a torch-ignition type internal combustion engine to cause turbulence in the combustible mixture.

However, these conventional techniques have not been free of drawbacks. In the intake swirl system, the charging efficiency lowers with increasing gas intake, which allows for no further increase in power output. The provision of the squish area in the combustion chamber cannot impart effective trubulence to the combustible mixture before ignition. The torch-ignition internal combustion engine causes turbulence in the early stage of combustion and cannot impart turbulence to the combustible mixture in the latter stage of combustion when it is really needed. In addition, it does not permit control over the timing of turbulence generation. Using a small-diameter intake port together with a large-diameter port also does not allow an ideal adaptation to an engine operating under various conditions such as high speed, high load conditions and idling.

Therefore, an object of this invention is to eliminate the aforementioned shortcomings, namely, to insure an ideal combustibility in the lean mixture combusting system or the voluminous exhaust gas recirculation system by generating sufficient turbulence in the combustible mixture in optimum timing with the stroke of the piston in the main combustion chamber.

This object of the invention is obtained by providing a reciprocating auxiliary piston in an auxiliary chamber having a passage communicating with a main combustion chamber. The auxiliary piston, which is coupled for movement by the main engine shaft, is moved forward at an optimum time as the main piston approaches top dead center on the compression stroke and injects a gas into the main combustion chamber through the communicating passage and, thereby, generates turbulence in the airfuel mixture therein.

BRIEF DESCRIPTION OF THE DRAWINGS

Specific embodiments of this invention will now be described in detail with particular reference to the accompanying drawings, wherein.

DETAILED DESCRIPTION OF THE INVENTION

Figure 1:
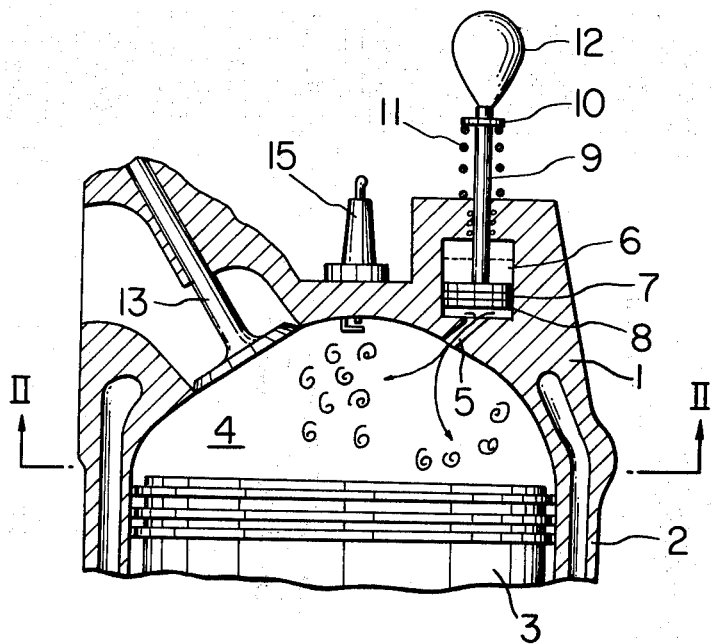
FIG. 1 is a sectional side elevation of a first embodiment of this invention.
Figure 2:
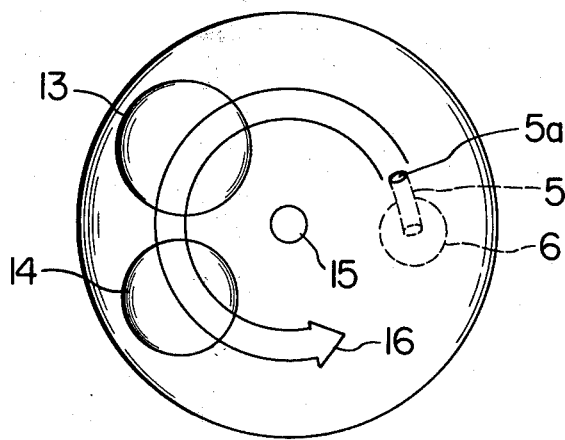
FIG. 2 is a cross section taken along the line II—II of FIG. 1.

FIGS. 1 and 2 illustrate the first embodiment of this invention, in which reference numeral 1 designates a cylinder head, 2 a cylinder, 3 a main piston and 4 a main combustion chamber. An auxiliary chamber 6 having a passage 5 communicating with the main combustion chamber 4 is provided in the cylinder head 1. In order to maintain an air seal, auxiliary chamber 6 is provided with an inset, for instance, a ring 7 mounted on reciprocating auxiliary piston 8. One end of a stem 9 projecting outward through the cylinder head 1 is fixed to the rear portion of the auxiliary piston 8. A retainer element 10 is fitted in the vicinity of the opposite end of the stem 9. A spring 11 compressedly coiled around the stem 9 and lying between the cylinder head 1 and retainer 10 urges the auxiliary piston 8 upward in a returning direction. A cam 12 interlocking with a main shaft (not shown) is mounted on the top end of the stem 9. The main combustion chamber 4 is also fitted with the usual intake valve 13, exhaust valve 14, and a spark plug 15.

As shown in FIG. 2, the communicating passage 5 circumferentially opens into the main combustion chamber 4 so as to generate a gas swirl as indicated by the arrow 16. Alternatively, the open end 5a of the communicating passage 5 may be directed toward the main piston 3 so that it generates turbulence in conjunction with the ascending motion of the main piston 3.

The operation of the first embodiment described above will now be explained. As the main piston 3 on the compression stroke moves upward close to the top dead center a preset position is reached at which cam 12 starts to rotate to depress the stem 9 and associated therewith the auxiliary piston 8, overcoming the biasing force of the spring 11. As a consequence, a powerful stream of gas, comprising the combustible mixture introduced during the compression stroke, gushes through the connecting passage 5. Since the auxiliary piston 8 is fitted with the sealing ring 7, the pressure generated in the main combustion chamber 4 does not diminish by gas leakage through the auxiliary chamber 6.

Since the open end 5a of the communicating passage 5 opens circumferentially in the main combustion chamber 4, as shown in FIG. 2, the gas injected from the communicating passage 5 into the main combustion chamber 4 creates a strong swirling motion therein as indicated by the arrow 16. This swirl increases the combustion rate of the lean combustible mixture in the main combustion chamber 4, achieves a stable combustion, and improves the overall combustibility of the mixture.

Figure 3:
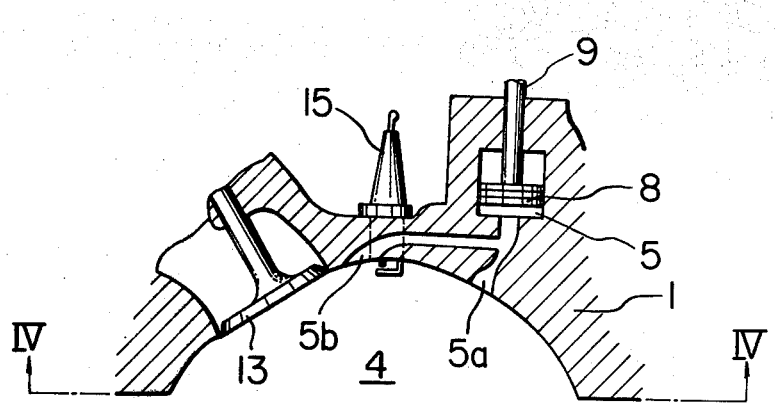
FIG. 3 is a sectional side elevation of a second embodiment of this invention.
Figure 4:
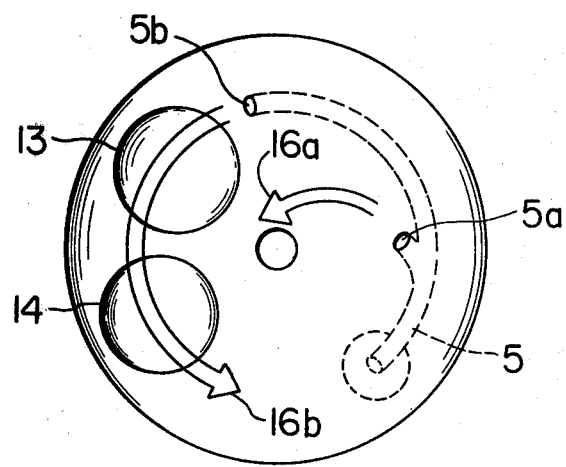
FIG. 4 is a cross section taken along the line IV—IV of FIG. 3.

FIGS. 3 and 4 illustrate the second embodiment of this invention. In this second embodiment, parts having functions similar to those of the first embodiment are designated by like reference numerals. The second embodiment differs from the first embodiment in that the communicating passage 5 has two open ends, i.e., a first open end 5a and a second open end 5b, as shown in FIGS. 3 and 4.

When so constructed, swirl is generated in more than one place in the main combustion chamber 4. The resulting swirls indicated by arrows 16a and 16b are more powerful, extensive and far-reaching than the single swirl in the first embodiment.

If one of the open ends of the communicating passage 5 is located in the vicinity of the spark plug 15, scavenging around spark plug 15 is accomplished, thereby increasing the ignitability of the combustion mixture and permitting more effective flame propagation. Also, as is readily apparent, it is possible to provide a plurality of independent communicating passages that lead direct from the auxiliary chamber 6, instead of providing open ends which branch midway from the single communicating passage 5 as shown in FIG. 4.

Figure 5:
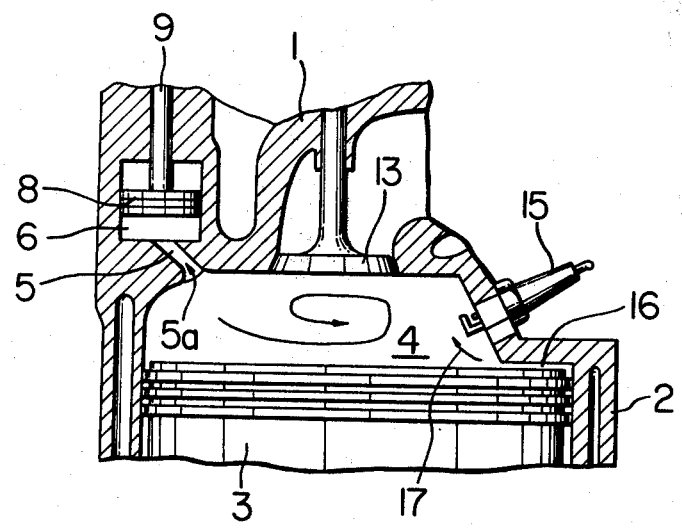
FIG. 5 is a sectional side elevation of a third embodiment of this invention; and, FIGS. 6 and 7 illustrate the timing of the reciprocating auxiliary piston.

FIG. 5 shows a third embodiment of the invention. This embodiment differs from the aforementioned first and second embodiments in that a squish area 16 is provided in the vicinity of the spark plug 15 and the open end 5a of the communicating passage 5 is situated in a position relatively distant from the spark plug 15. With this construction, the squish generates turbulence 17 favorable to ignition in the vicinity of the spark plug 15 and, then, the jet stream from the open end 5a causes the resulting frame core to propagate to every corner of the main combustion chamber 4.

Figure 6:
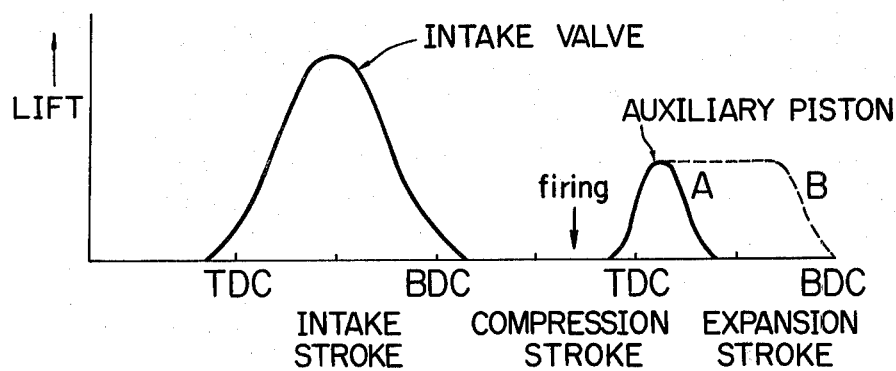
Figure 7:
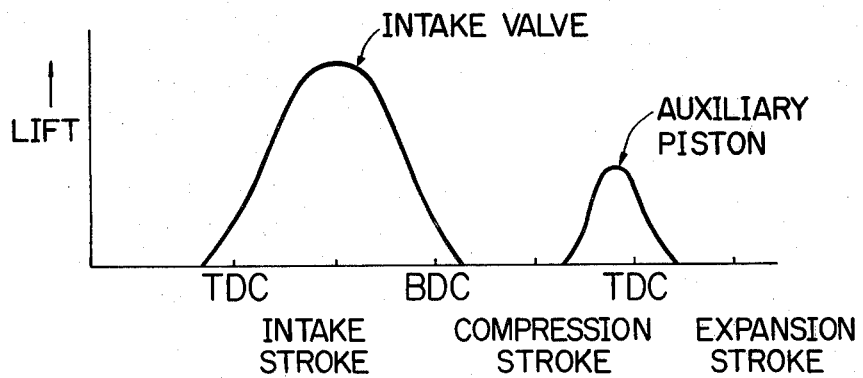

FIGS. 6 and 7 exemplify the operating timing of the auxiliary piston 8. Generally, the auxiliary piston 8 is adapted to move forward (i.e., to move downward in the first, second and third embodiments) as the main piston on the compression stroke approaches top dead center. In spark-ignited internal combustion engines, the ignitability of the combustible mixture usually drops if large turbulence exists in the vicinity of the spark plug at the time of ignition. Accordingly, in these internal combustion engines, it is necessary to move the auxiliary piston 8 and generate a swirl in the main combustion chamber 4 after the completion of ignition, as illustrated in FIG. 6.

As indicated by the dotted line B in FIG. 6, the auxiliary piston 8 may be kept stationary at the highest lift point throughout substantially the entire range of the expansion stroke. This type of operation prevents a cooling loss by the auxiliary chamber 6 since the auxiliary piston 8 reduces the space in the auxiliary chamber 6 practically to zero throughout substantially the entire range of the expansion stroke.

The timing of FIG. 7 differs from that of FIG. 6, since it is for an internal combustion engine in which the turbulence in the main combustion chamber does not readily propagate. Therefore, the forward motion of the auxiliary piston 8 starts earlier than in the case of FIG. 6.

As will be evident from the above, this invention achieves the following advantages with respect to improving combustibility in an internal combustion engine:

(1) Since the auxiliary piston fitted in the auxiliary chamber having the passage communicating with the main combustion chamber is reciprocated by external force, suitable quantities of gas may be injected at desired optimum timings in different types of internal combustion engines. This generates effective turbulence in the main combustion chamber and, thereby attains an ideal combustion for either the lean mixture combustion system or the voluminous exhaust gas recirculation system.

(2) Since the open end of the communicating passage leading from the auxiliary chamber preferably opens circumferentially in the main combustion chamber, swirl occurs therein to bring about higher combustibility. If a plurality of open ends are provided in such directions as will impart additional motion to the swirl produced, the resulting swirl will be that much the greater.

(3) The internal combustion engines according to this invention are much simpler in construction than conventional engines of similar types. The use of a cam interlocking with the main engine shaft for reciprocating the auxiliary piston offers great economy and technical advantages since the mechanism of the conventional internal combustion engine can be utilized without modification.

It is apparent that this invention is not limited to the specific embodiments described above, but may be variously adapted and modified without departing from its spirit and scope. For instance, this invention achieves the same valuable operations and results as described above not only with spark-ignition internal combustion engines but also with compression-ignition internal combustion engines. In the foregoing embodiments, the auxiliary piston is depressed by a cam interlocking with the main engine shaft; however, it may also be reciprocated by any other suitable power source. Further, the number of open ends (5a, 5b) in the communicating passage 5 is not limited to one or two as more may be provided in the main combustion chamber. In addition, the cross-section of the open ends need not be circular. A slit-like or other variation in the open end will also produce a layer of swirl in the main combustion chamber.

What is claimed is:

1. An internal combustion engine comprising:
a main combustion chamber;
a main reciprocable piston in said main combustion chamber;
an auxiliary chamber;
a spark plug in said main combustion chamber;
a passageway communicating said auxiliary chamber with said main combustion chamber, said passageway opens circumferentially into said main combustion chamber which causes said injected gas to impart a swirling motion to gasses in said main combustion chamber, said passageway contains a pair of exit ports located in said main combustion chamber, said pair of exit ports imparting a pair of swirling motions to gasses in said main combustion chamber, said pair of exit ports impart respective swirling motions which are in substantially the same circumferential direction, and one exit port of said pair is located in the vicinity of said spark plug in said main combustion chamber and its respective swirling gas motion moves adjacent said spark plug;

a reciprocable auxiliary piston in said auxiliary chamber for injecting a turbulence causing gas mixture through said passageway and into said main combustion chamber; and means for controlling the reciprocal movement of said auxiliary piston, said means for controlling causing said auxiliary piston to inject the gas mixture into said main combustion chamber when said main piston is near the top dead center position of its reciprocal movement.

2. An internal combustion engine as in claim 1 further comprising:

a stem coupled to said auxiliary piston;

means for biasing said stem and said auxiliary piston to a retracted position, and wherein said means for controlling comprises:

a cam operatively connected to a main shaft of said engine and coupled to said stem for moving said stem and auxiliary piston away from said retracted position in accordance with movement of the main shaft of said engine.

3. An internal combustion engine as in claim 1 wherein a plurality of passageways communicating said auxiliary chamber with said main combustion chamber are provided.

4. An internal combustion engine as in claim 1 wherein said auxiliary piston injects said gas mixture into said main combustion chamber as said main piston approaches a top dead center position.

5. An internal combustion engine as in claim 1 wherein said auxiliary piston injects said gas mixture into said main combustion chamber after ignition of a gas mixture contained in said main combustion chamber.

* * * * *